(12) United States Patent
Friedlander et al.

(10) Patent No.: US 7,523,118 B2
(45) Date of Patent: Apr. 21, 2009

(54) SYSTEM AND METHOD FOR OPTIMIZING FEDERATED AND ETL'D DATABASES HAVING MULTIDIMENSIONALLY CONSTRAINED DATA

(75) Inventors: Robert R. Friedlander, Southbury, CT (US); Richard Hennessy, Austin, TX (US); James R. Kraemer, Santa Fe, NM (US)

(73) Assignee: International Business Machines Corporation, Armonk, NY (US)

( * ) Notice: Subject to any disclaimer, the term of this patent is extended or adjusted under 35 U.S.C. 154(b) by 202 days.

(21) Appl. No.: 11/416,973

(22) Filed: May 2, 2006

(65) Prior Publication Data

US 2007/0276851 A1 Nov. 29, 2007

(51) Int. Cl.
*G06F 17/30* (2006.01)
(52) U.S. Cl. .................... 707/100; 707/101; 707/103 R; 707/103 Y
(58) Field of Classification Search ........................ None
See application file for complete search history.

(56) References Cited

U.S. PATENT DOCUMENTS

| | | | | | |
|---|---|---|---|---|---|
| 6,167,405 | A | * | 12/2000 | Rosensteel et al. | 707/102 |
| 6,269,365 | B1 | * | 7/2001 | Kiyoki et al. | 707/6 |
| 6,353,818 | B1 | * | 3/2002 | Carino, Jr. | 707/2 |
| 7,019,740 | B2 | * | 3/2006 | Georgalas | 345/418 |
| 7,047,253 | B1 | * | 5/2006 | Murthy et al. | 707/103 R |
| 7,152,070 | B1 | * | 12/2006 | Musick et al. | 707/101 |
| 7,191,183 | B1 | * | 3/2007 | Goldstein | 707/101 |
| 2001/0051881 | A1 | * | 12/2001 | Filler | 705/3 |
| 2003/0212664 | A1 | * | 11/2003 | Breining et al. | 707/3 |
| 2007/0174840 | A1 | * | 7/2007 | Sharma et al. | 718/104 |

OTHER PUBLICATIONS

Laura Haas and Eileen Liu. *IBM Federated Database Technology*. http://www.-128ibm/developerworks/db2/library/techarticle/0203haas (Mar. 2002).
Marty Lurie. *The Federation-Database Interoperability*. http://www.-128ibm/developerworks/db2/library/techarticle/0304lurie (Apr. 2003).

* cited by examiner

*Primary Examiner*—Khanh B. Pham
*Assistant Examiner*—Andalib F Lodhi
(74) *Attorney, Agent, or Firm*—John R. Pivnichny; Law Office of Jim Boice

(57) ABSTRACT

Method, system, and program product for configuring and using a federated database management system. The design of the metadata and queries includes the steps of first determining schema and metadata configurations of the data source servers. The next step is enumerating available resources, and enumerating security and confidentiality requirements. These are used for calculating an optimal federated database management system design based on the schema and metadata, the enumerated available resources, and the enumerated security and confidentiality requirements; and designing an optimal federated database management system.

8 Claims, 11 Drawing Sheets

SYSTEM AND METHOD FOR OPTIMIZING FEDERATED AND ETL'D DATABASES HAVING MULTIDIMENSIONALLY CONSTRAINED DATA

BACKGROUND

1. Field of the Invention

The invention described herein relates to extracting data from a federated database system, that is, from a meta-database management system which transparently integrates multiple autonomous database systems into a single virtual database, that is, a federated database. The constituent database systems remain autonomous, separate, and distinct. The method, system, and program product described herein are directed to searching for data stored in a federated, distributed computer system and to the management of the distributed database, including the database data and file access and retrieval, and retrieval of database data and files from a federated database. A further aspect of the invention includes organizing and inter-relating data or files, including relational, network, hierarchical, and entity-relationship models.

2. Background Art

A federated database system is a type of meta-database management system (DBMS) which transparently integrates separate, distinct, multiple autonomous database systems into a single federated database. The constituent databases are interconnected via computer networks, the internet, local area networks, and virtual networks and may be geographically decentralized. Since the constituent database systems remain autonomous, a federated database system is an alternative to the non-trivial task of merging together several disparate databases.

Through data abstraction, wrapper functions, and container functions, federated database systems can provide a uniform front-end user interface, enabling users to store and retrieve data in multiple databases with a single query, even if the constituent databases are heterogeneous. To this end, a federated database system must be able to deconstruct the query into subqueries for submission to the relevant constituent DBMS's after which the system must consolidate or aggregate the result sets of the subqueries.

Because various database management systems employ different query languages, federated database systems must frequently apply wrappers to the subqueries to translate them into the appropriate query languages.

Federated databases have heretofore been variously predicted to be capable of solving a myriad of problems at the conceptual level. However, for real world, practical problems, federated databases have not lived up to the predictions. One particularly vexing challenge is obtaining optimal solutions for multi-dimensional physical and "people" challenges.

Thus, a clear need exists to look at a problem beyond the database metadata level and the machine level, and to explore the solution space and associated soft constraints. By soft constraints we mean legal and institutional constraints, such as confidentiality and ethics, availability of people, performance requirements, and the like.

SUMMARY OF THE INVENTION

These and other problems are obviated by the method, system, and program product described herein. Specifically, the invention described herein provides a method, system, and program product for matching skills and assets, especially people skills and people assets to requirements and needs.

Specifically, the method, system, and program product of our invention solves the allocation problem stated thusly "I have a set of people, each person with a skill set, and because of external constraints (legal, collective bargaining, etc.) only certain people can be assigned to certain tasks, and certain data can not leave certain venues or be given to certain people, and certain data can not be materialized. According to the invention described herein data, including legacy database data and data from disparate databases is federated to yield a solution space, where solution sets are optimized, for example, by integer programming.

The method, system, and program product utilize database federation and "Extract, Transform, and Load" ("ETL") database management to query, search, and selectively extract data, present the data, analyze and present the data using complex optimization, for example, integer programming, mixed integer programming, heuristics, and artificial intelligence, among other techniques, human intervention and requesting additional data.

When the method, system, and program product are used in a research or clinical environment, for example with subsequent publication (or submission to regulatory authorities), there needs to be enough data released to satisfy academic, institutional, or regulatory requirements. This enables the product to be the sum of large volumes of individual data.

The steps of querying, searching, and selectively extracting data are carried out subject to restraints on materialization and presentation. These restraints include, by way of example and not limitation, private personal data, such as the presence of absence of sexually transmitted diseases, the presence or absence of genetic anomalies, and even creditworthiness.

Similarly, the restraints may include institutionally confidential data, such as who will perform work, resource allocations and commitments, budgets, skill sets, policies, allocation of expenses, contributions in kind in lieu of cash payments, time constraints on inputs and outputs. Additionally, in a clinical, testing, or epidemiological context information transfer may be constrained by law, as HIPP limitations, and personal constraints.

With federated data, the entire totality of the data need only be materialized during computation, and the finished product is only aggregated data, as only totals and statistics.

In actual computation interim databases are built, using temporary tables, associative tables on different tables on different dbms systems in the federated system. As soon the query is run on the federated system and reported, the temporary tables are locked or otherwise disappear.

The method, system, and program product described herein explores the global problem space, lays out all of the constraints, and optimizes them against a weighted, multidimensional criteria function, using, for example, integer programming techniques. The entire data set is used to model potential solutions, including data structures, metadata, data schemas, and possible associative tables, comparing ETL solutions versus federation solutions, as constrained by costs, policies, availability of people and assets, and required time lines.

THE FIGURES

Various aspects of the invention are illustrated in the figures appended hereto.

Figure 11:
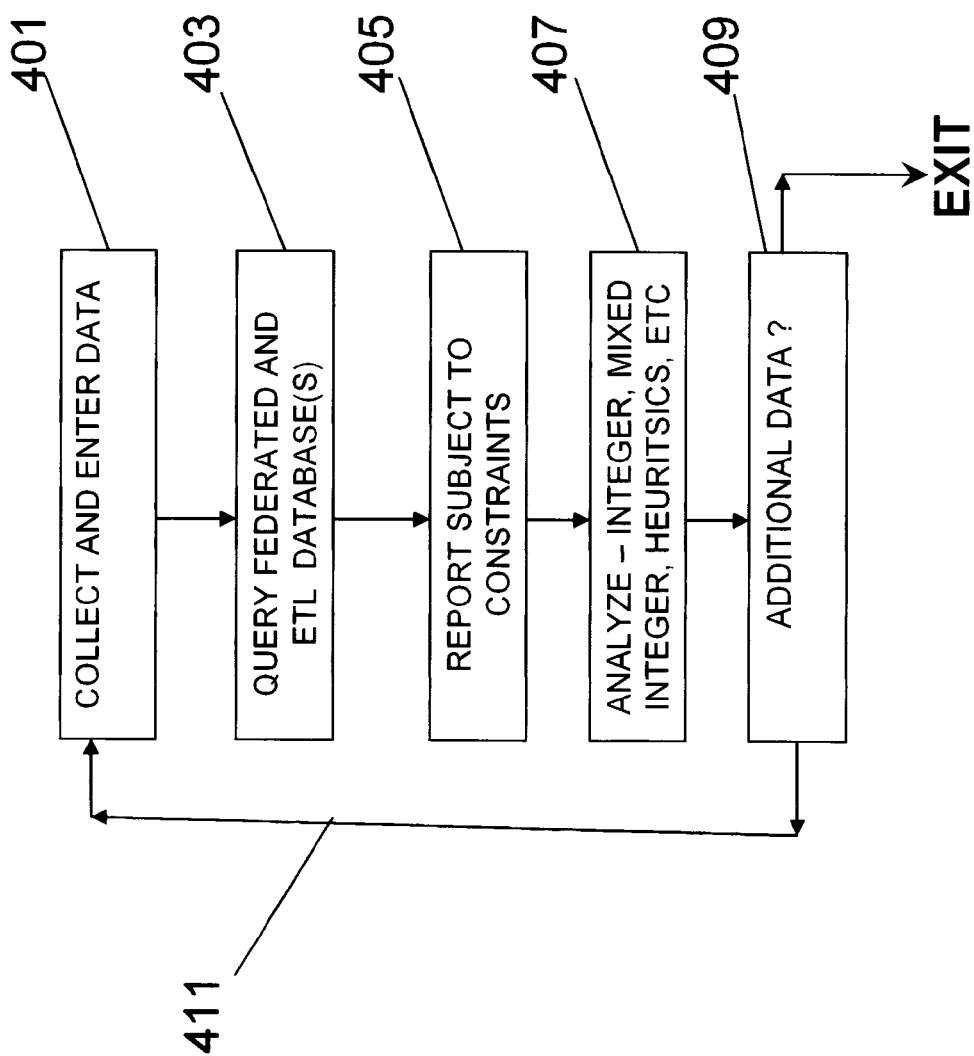

FIG. 11, illustrates a high level overview of database federation and "Extract, Transform, and Load" ("ETL") database management to query, search, and selectively extract data, present the data, analyze and present the data using complex optimization, for example, integer programming, mixed integer programming, heuristics, and artificial intelligence, among other techniques, human intervention and requesting additional data.

DETAILED DESCRIPTION

The method, system, and program product of our invention solves the allocation problem stated thusly "I have a set of people, each person with a skill set, and because of external constraints (legal, collective bargaining, etc.) only certain people can be assigned to certain tasks, and certain data can not leave certain venues or be given to certain people, and certain data can not be materialized.

When the method, system, and program product are used in a research environment with subsequent publication (or submission to regulatory authorities), there needs to be enough data released to satisfy academic, institutional, or regulatory requirements. Database federation enables the output to be the result of large volumes of individual data.

With federated data, the totality of the data is only materialized during computation, with the finished product being only aggregated data, as only totals and statistics.

In actual computation interim databases are built, using temporary tables, associative tables derived from different tables on different dbms systems in the federated system. As soon the query is run on the federated system and reported, the temporary tables are locked or otherwise disappear.

The method, system, and program product described herein explores the global problem space, lays out all of the constraints, and optimizes them against a weighted, multidimensional criteria function. The entire data set is used to model potential solutions, including data structures, metadata, data schemas, and possible associative tables, comparing ETL solutions versus federation solutions, as constrained by costs, policies, availability of people and assets, and required time lines.

Figure 1:
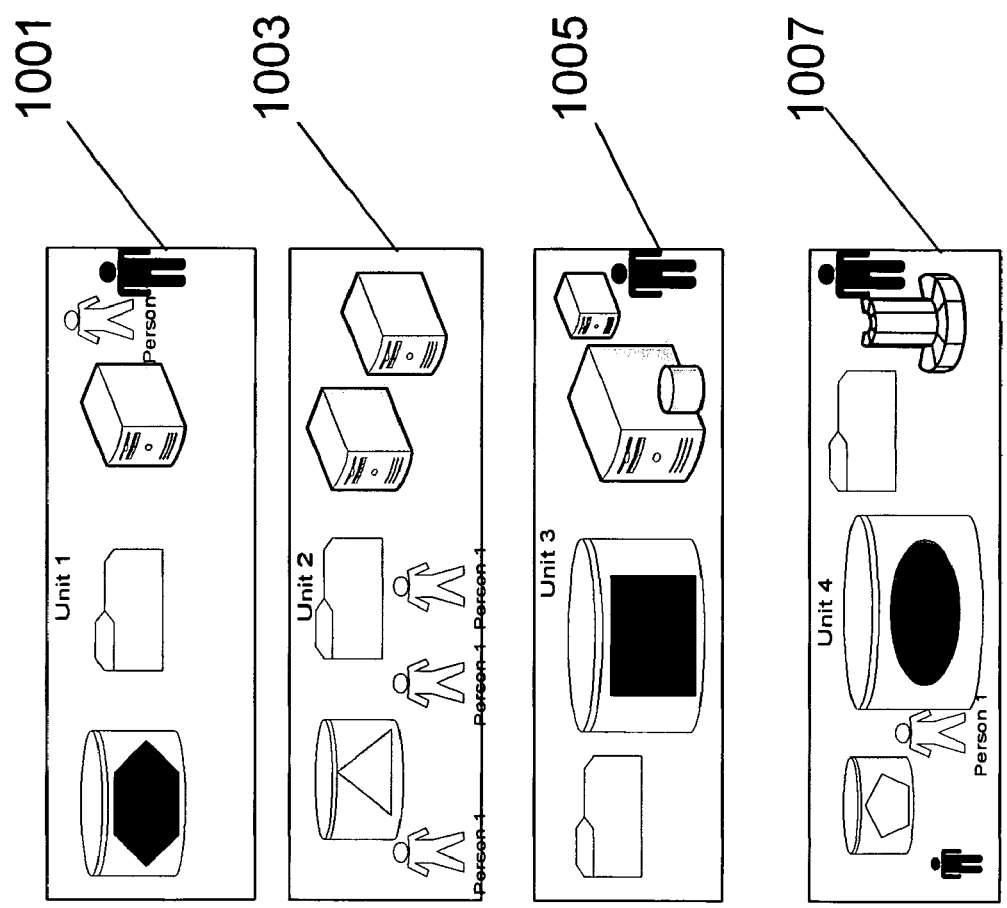
FIG. 1 illustrates the initial step of discovering the current environment.

FIG. 1 illustrates the initial step of discovering the current environment, involving units 1001, 1003, 1005, 1007. This involves assessing different source system data constraints, as well as retrospective and prospective data integration challenges, and the impact of client and industry data standards. Constraints and opportunities include current integration capabilities, the nature of the desired integration solution or solutions, and client team skills.

Figure 2:
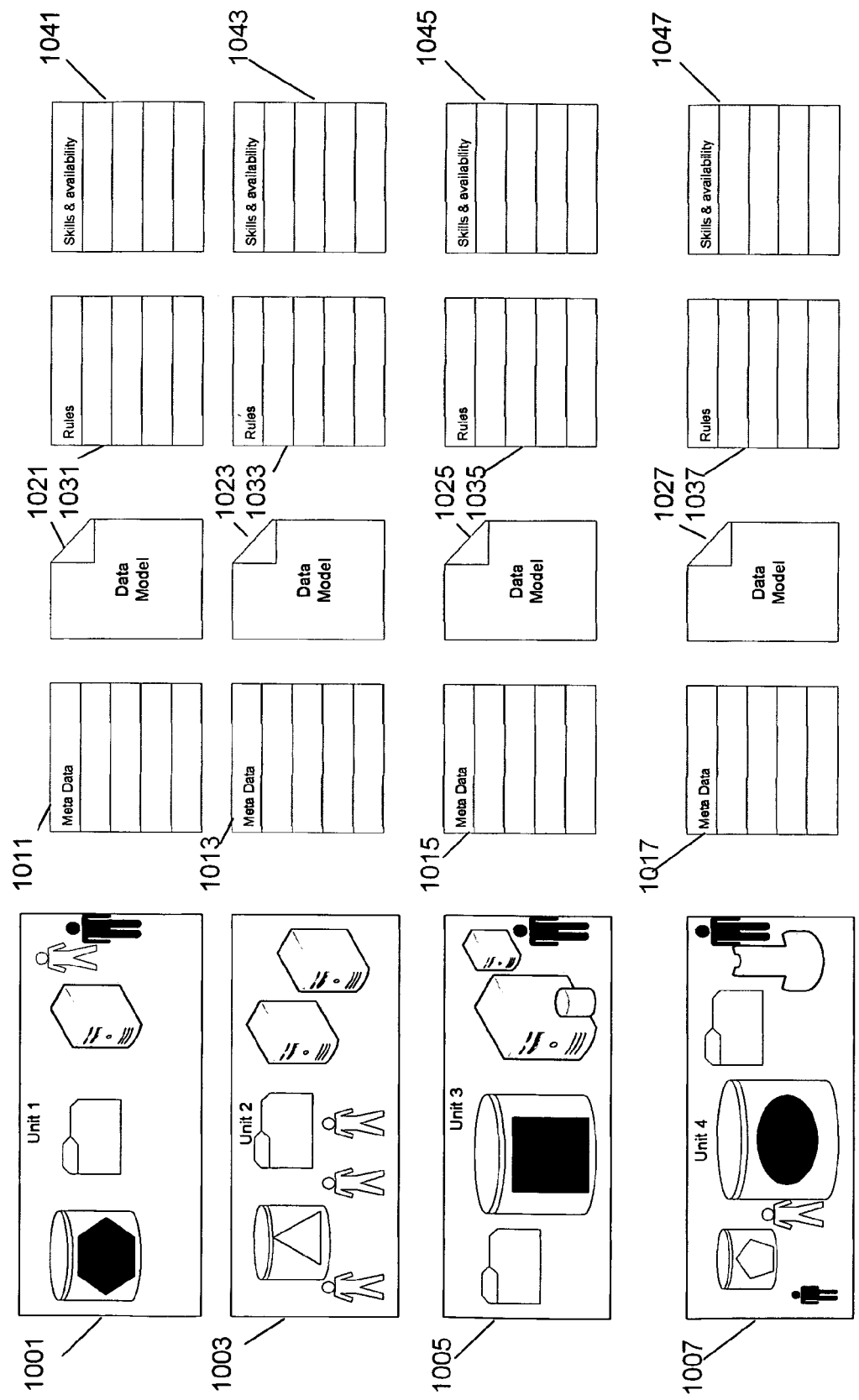
FIG. 2 illustrates the next step, analysis of the current environment.

FIG. 2 illustrates the next step, analysis of the current environment, including units 1001, 1003, 1005, 1007. Analyzing the current environment includes understanding the available metadata, 1011, 1013, 1015, 1017, by source. Also included is analyzing the current environment to analysis of the data integration approach and data model 1021, 1023, 1025, 1027, by source, indicating ETL or federation or a hybrid approach and defining the integration rules that must be adhered to, 1031, 1033, 1035, 1037. As a follow on, current skills, 1041, 1043, 1045, 1047 are assessed, an optimal skill set recommended, and mechanisms are determined to close the gap. The analysis also includes determining an optimal use of exiting infrastructure to maximize availability.

Figure 3:
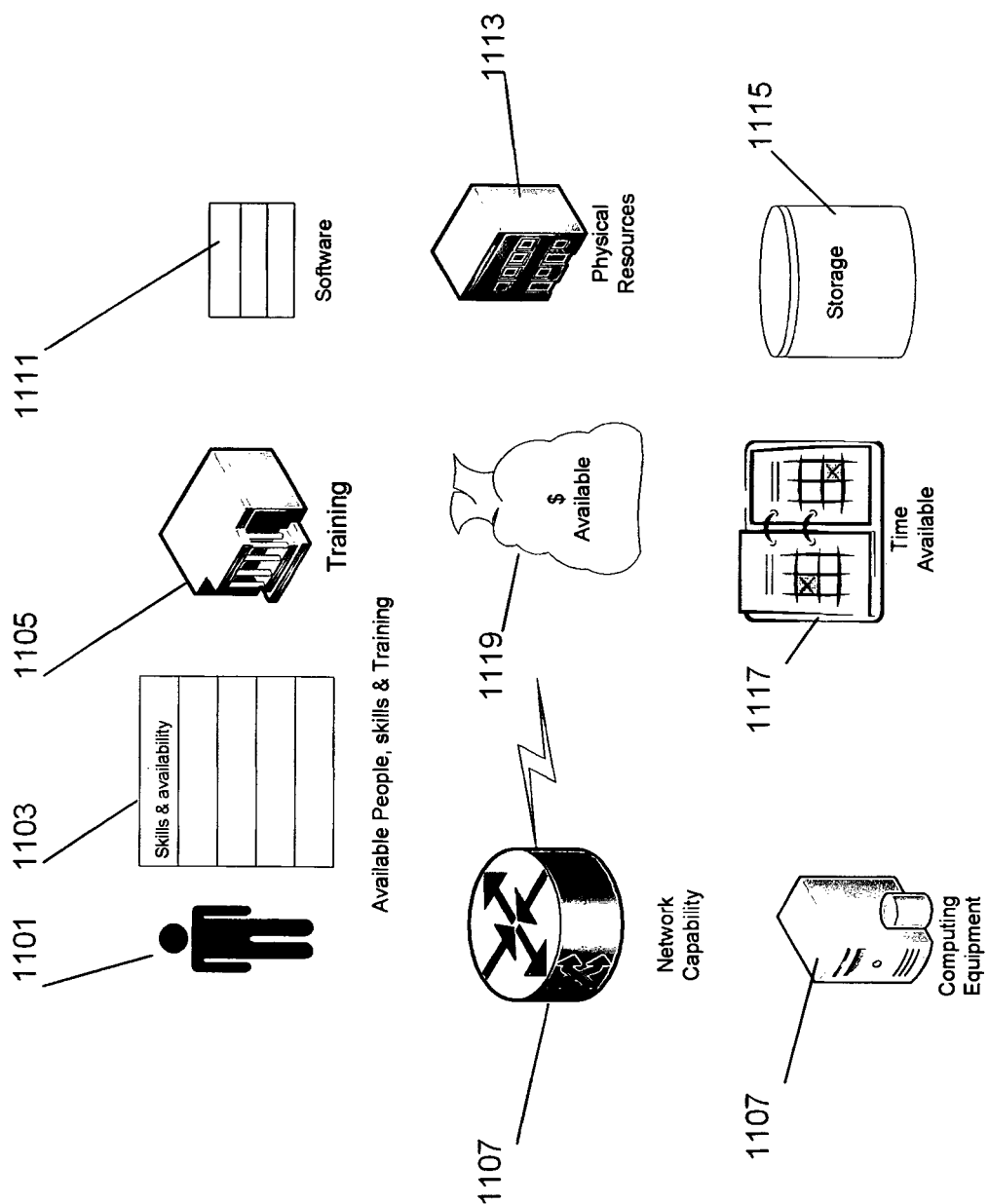
FIG. 3 illustrates the step of defining available resources.

FIG. 3 illustrates the step of defining available resources. In this context the resources include available people 1101 with the skills 1102 and training 1105, availability of additional training, networks and networks capabilities 1107, computing equipment 1109 and software availability 1111, physical resources 1113, memory 1115, time constraints 1117, and dollar availability (funding) 1119.

Figure 4:
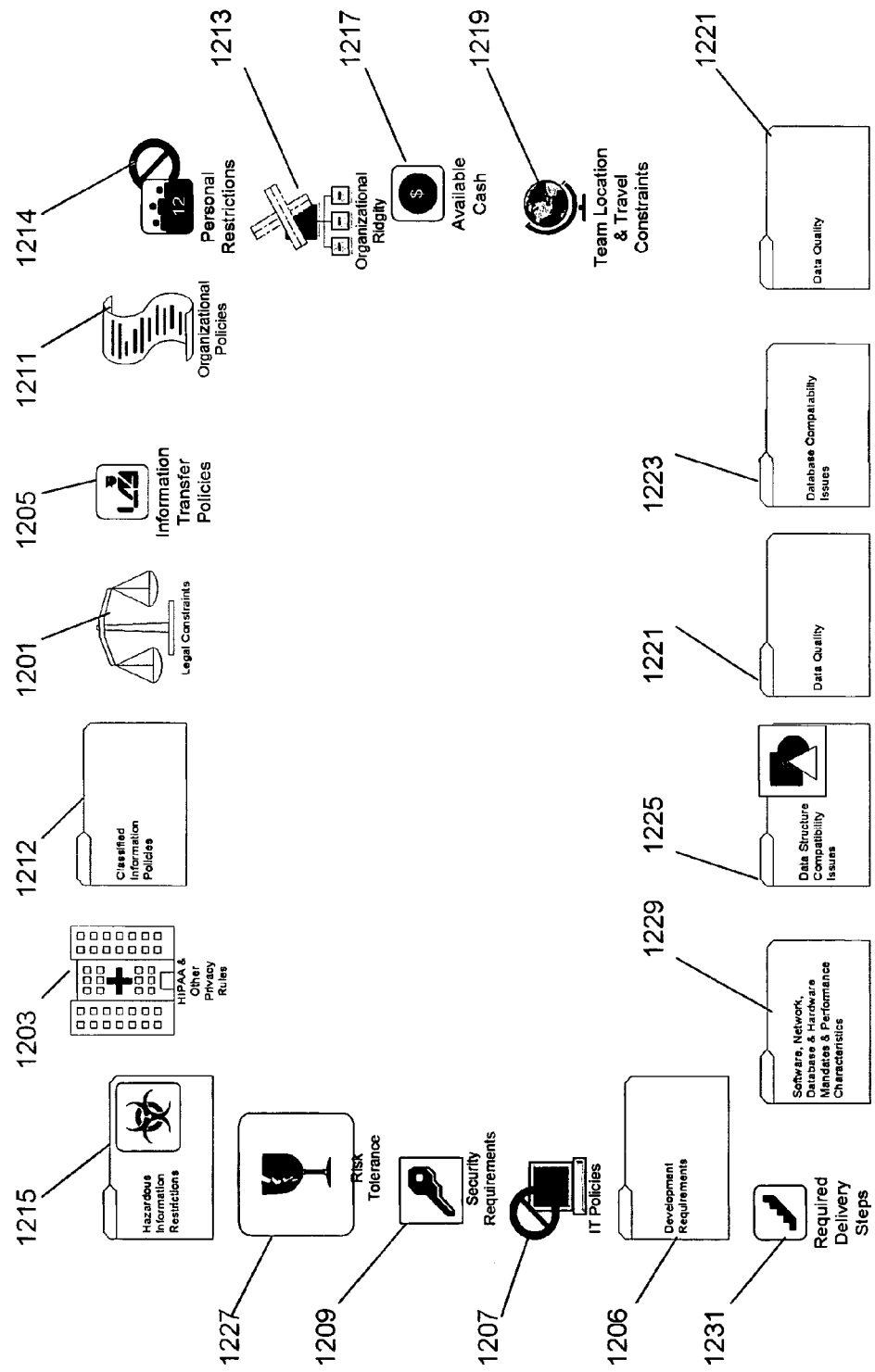
FIG. 4 illustrates the step of defining project constraints.

FIG. 4 illustrates the step of defining project constraints. These may be legal 1201 (HIPA, intellectual property), security 1203 (information transfer 1205, IT 1207 and security constraints 1209) societal (organizational structures and constraints 1211, personal policies 1212 and restrictions 1214, organizational flexibility 1213), environmental (hazardous materials 1215), cash constraints 1217, team locations 1219 and travel constraints, data (database interoperability 1225, data compatibility 1223, data quality 1221), risk adversity 1227, and IT assets 1229 (software, network, database and hardware mandates and performance characteristics), development requirements 1226, and required delivery steps 1231.

Figure 5:
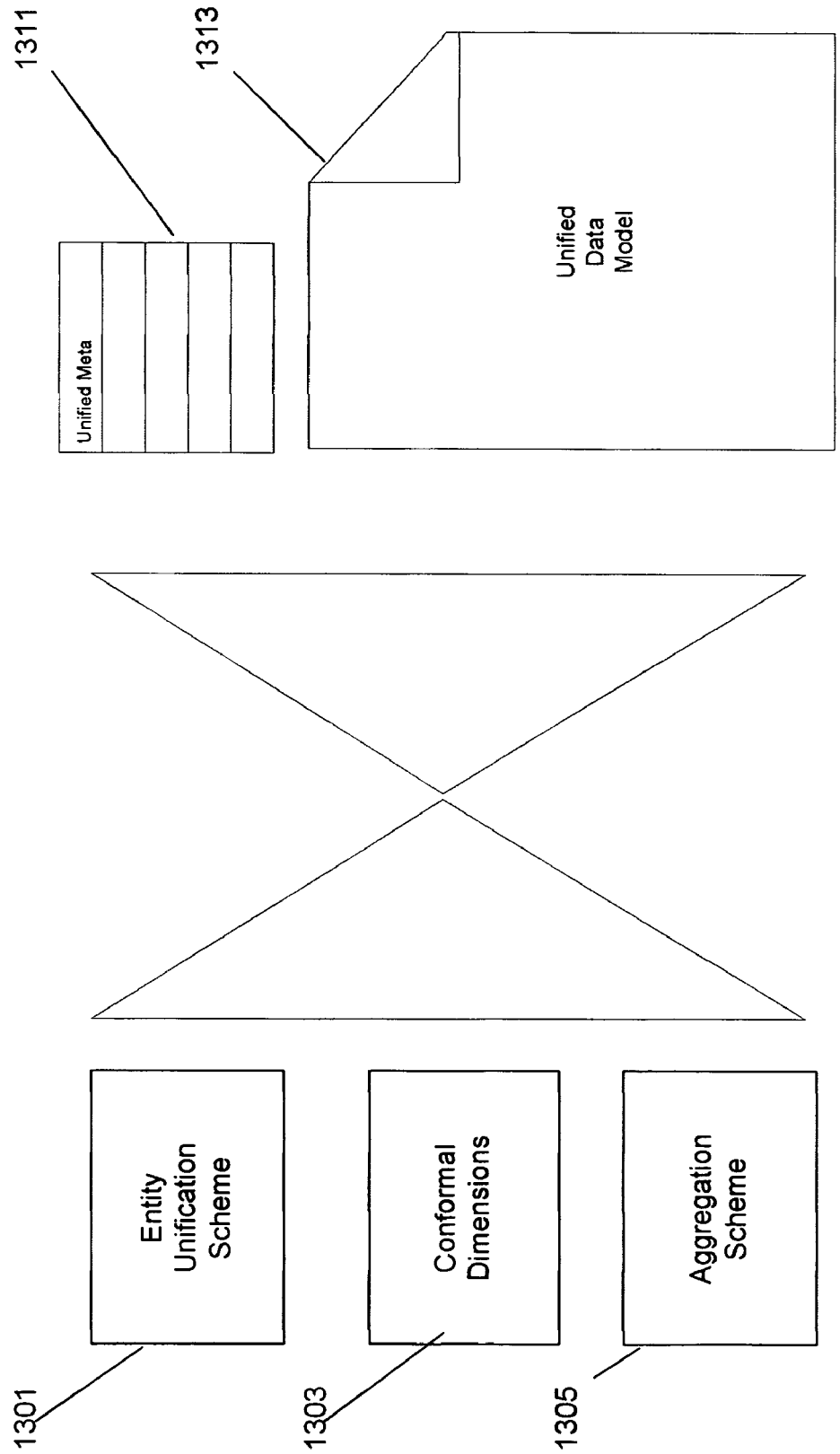
FIG. 5 illustrates designing an optimal solution to achieve the requirements.

FIG. 5 illustrates designing an optimal solution to achieve the requirements. The optimal solution includes an entity unification scheme or schemes 1301, conformal dimensions 1303, and aggregation schemes 1305, and obtaining a unified metadata model 1311 and a unified data model 1305.

Figure 6:
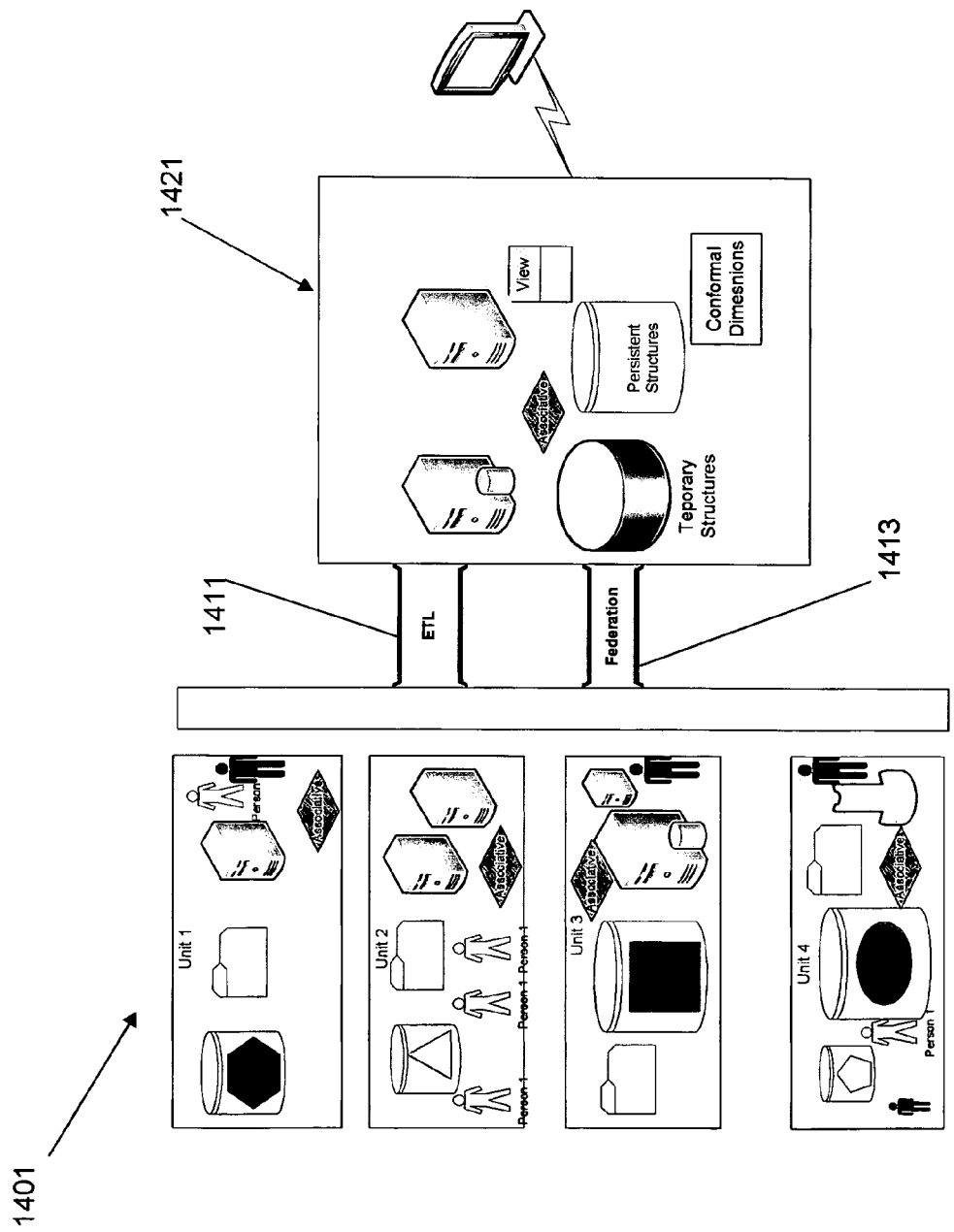
FIG. 6 illustrates the step of calculate the optimal solution, given all constraints, claims, and resources.

FIG. 6 illustrates the step of calculating the optimal solution, given all constraints, claims, and resources. In this step the various resource sets are claimant sets 1401 which are processed through ETL 1411, federation 1413, or a hybrid. These data items are processed in, for example temporary structures and persistent structures, all to yield a "view" 1421.

Figure 10:
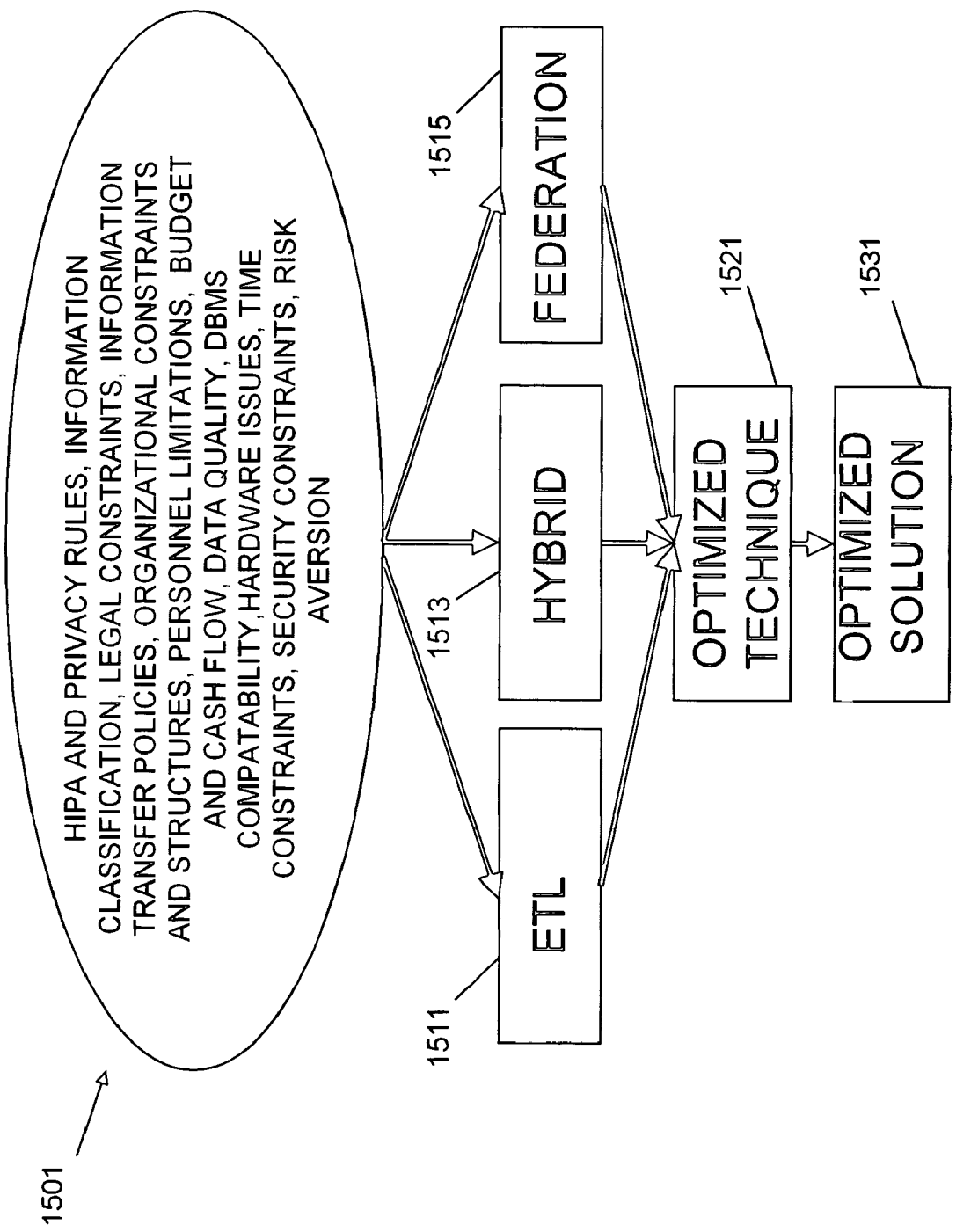
FIG. 10 represents a decision tree for going from an input of the constrained variables and constraints through analysis of the constraints and variables to optimize the optimization tools and techniques, and performing the optimization.

This method as shown in FIG. 10 optimizes federated and ETL'd databases and database queries within a context of multidimensional constraints, bringing data together using ETL 1511, a hybrid 1513 of ETL and federation, and federation 1515 technologies to determine an optimized technique 1521 to obtain the optimized solution, including sets of candidate optimal solutions.

In a large modern enterprise, for example, a medical research institution, a university, a medical center, or a multidivisional business, it is almost inevitable that different portions of the organization will use different database management systems to store and search their critical data. Yet it is only by combining the information from these systems that the modern clinical, academic, or research enterprise can realize the full value of the data they contain.

For example, in the health care industry, mergers, consolidations, and acquisitions are an almost commonplace occurrence. The newly created or consolidated entity inherits the data stores of the original institutions. Many of those stores will be relational database management systems, but often from different manufacturers; for instance, one company may have used primarily Sybase, and another Informix IDS. They may both have one or more document management systems—such as Documentum or IBM Content Manager—for storing text documents such as copies of patient records, orders, lab tests, etc. Each may have applications that compute important information (for example, allergies, drug reactions and interactions, and the like), or mine for information about patients' or test subjects' health issues.

After institutional consolidation, they need to be able to access all patient information from both sets of stores, analyze their new portfolios using existing and new applications, and, in general, use the combined resources of the original institutions through a common interface. They need to be able to identify common patients and subjects and consolidate the relevant portions of their patient records, although the different services and departments, clinical and research, may have non-uniformly referred to their patients using totally different identifying keys. Federation technologies can significantly ease the pain in these situations by providing a unified interface to diverse data.

If a federated system is transparent, it masks from the user the differences, idiosyncracies, and implementations of the underlying data sources. Ideally, it makes the set of federated sources look to the user like a single system. The user should not need to be aware of where the data is stored (location transparency), what language or programming interface is supported by the data source (invocation transparency), if SQL is used, what dialect of SQL the source supports (dialect transparency), how the data is physically stored, or whether it is partitioned and/or replicated (physical data independence, fragmentation and replication transparency), or what networking protocols are used (network transparency). The user should see a single uniform interface, complete with a single set of error codes (error code transparency). IBM provides all these features, allowing applications to be written as if all the data were in a single database, although, in fact, the data may be stored in a heterogeneous collection of data sources.

A further aspect of federation is heterogeneity. Heterogeneity is the degree of differentiation in the various data sources. Sources can differ in many ways. They may run on different hardware, use different network protocols, and have different software to manage their data stores. They may have different query languages, different query capabilities, and even different data models. They may handle errors differently, or provide different transaction semantics. They may be as much alike as two Oracle instances, one running Oracle 8i, and the other Oracle 9i, with the same or different schemas. Or they may be as diverse as a high-powered relational database, a simple, structured flat file, a web site that takes queries in the form of URLs and spits back semi-structured XML according to some DTD, a Web service, and an application that responds to a particular set of function calls. IBM's federated database can accommodate all of these differences, encompassing systems such as these in a seamless, transparent federation.

In a federated system, new sources may be needed to meet the changing needs of the users' business. Federation makes it easy to add new sources. The federated database engine accesses sources via a software component know as a wrapper. Accessing a new type of data source is done by acquiring or creating a wrapper for that source. The wrapper architecture enables the creation of new wrappers. Once a wrapper exists, simple data definition (DDL) statements allow sources to be dynamically added to the federation without stopping ongoing queries or transactions.

Any data source can be wrapped. IBM supports the ANSI SQL/MED standard (MED stands for Management of External Data). This standard documents the protocols used by a federated server to communicate with external data sources. Any wrapper written to the SQL/MED interface can be used with IBM's federated database. Thus wrappers can be written by users, vendors, and third parties.

A still further aspect of federation is autonomy for data sources. Typically a data source has existing applications and users. It is important, therefore, that the operation of the source is not affected when it is brought into a federation. Existing applications will run unchanged, data is neither moved nor modified, interfaces remain the same. The way the data source processes requests for data is not affected by the execution of global queries against the federated system, though those global queries may touch many different data sources. Likewise, there is no impact on the consistency of the local system when a data source enters or leaves a federation.

Optimized performance is attained through an optimizer. The optimizer is the component of a relational database management system that determines the best way to execute each query. Relational queries are non-procedural and there are typically several different implementations of each relational operator and many possible orderings of operators to choose from in executing a query. While some optimizers use heuristic rules to choose an execution strategy, the preferred federated database considers the various possible strategies, modeling the likely cost of each, and choosing the one with the least cost. (Typically, cost is measured in terms of system resources consumed).

In a federated system, the optimizer must decide whether the different operations involved in a query should be done by the federated server or by the source where the data is stored. It must also determine the order of the operations, and what implementations to use to do local portions of the query. To make these decisions, the optimizer must have some way of knowing what each data source can do, and how much it costs. For example, if the data source is a file, it would not make sense to assume it was smart, and ask it to perform a sort or to apply some function. On the other hand, if the source is a relational database system capable of applying predicates and doing joins, it might be a good idea to take advantage of its power if it will reduce the amount of data that needs to be brought back to the federated engine. This will typically depend on the details of the individual query. In one embodiment the optimizer works with the wrappers for the different sources involved in a query to evaluate the possibilities. Often the difference between a good and a bad decision on the execution strategy is several orders of magnitude in performance.

To further enhance performance, each wrapper implementation takes advantage of the operational knobs provided by each data source using the source's native API. For example, blocking multiple result rows into one message (a.k.a. block fetch) is a common performance knob. The query compiler will communicate with the wrapper to indicate which query fragments can utilize block fetch and thus achieve the maximal performance at runtime without loss of query semantics.

Figure 7:
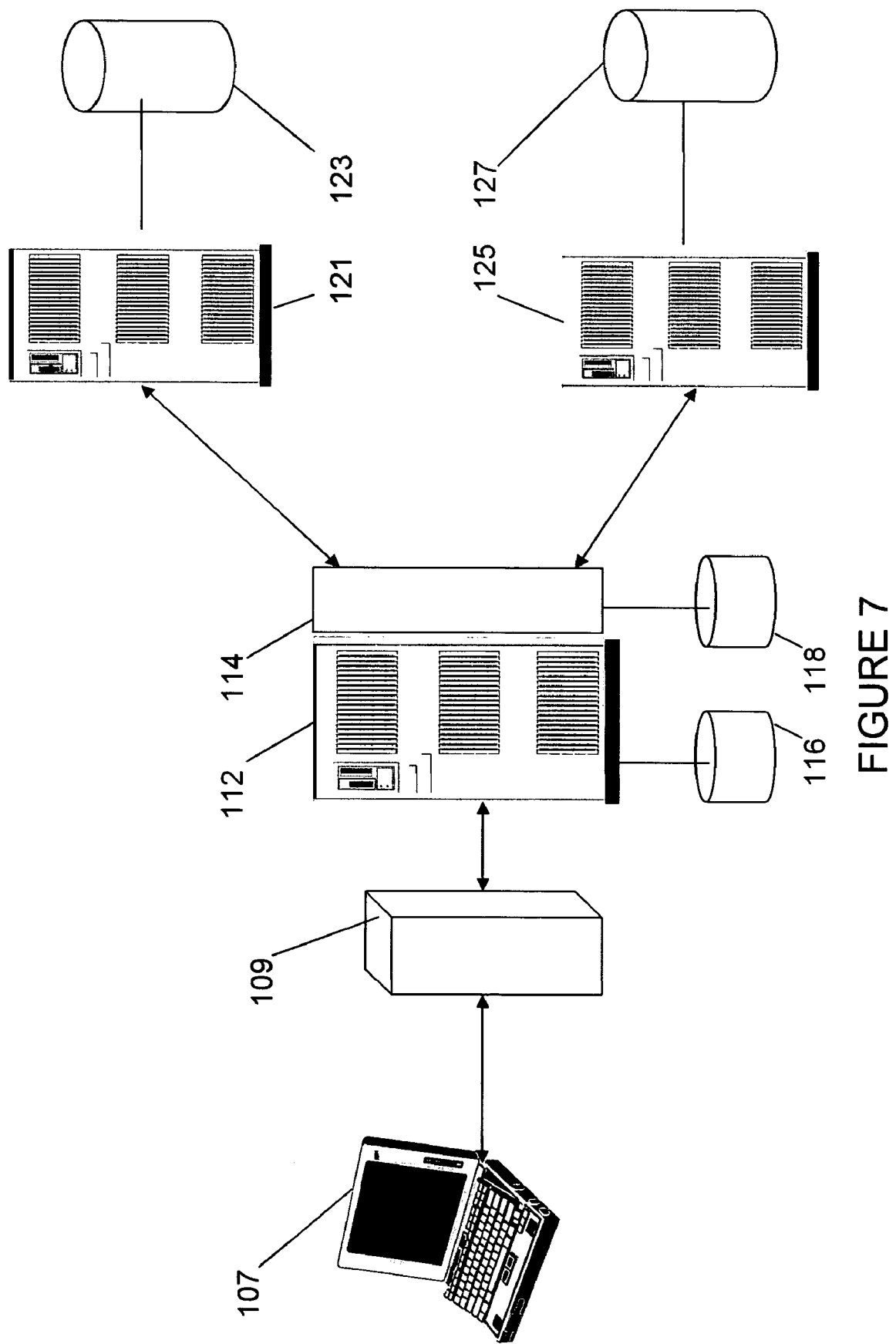
FIG. 7 illustrates an overview of a federated data system.

One federated system architecture is shown in FIG. 7 Applications can use any supported interface (including ODBC, JDBC, or a Web service client) to interact with the federated server. The federated server communicates with the data sources by means of software modules called wrappers. The system includes a client 107, an SQL API 109, and a federated database server 112. The federated database server 112 includes a wrapper application 114, a database catalog 116 and a metadata database 118. The server 112 receives data from a plurality of back end data sources 121, 125 with associated data repositories 123, 127.

A federated system is created by installing the federated engine 112 and then configuring it to talk to the data sources. There are several steps to add a new data source 121 or 125 to a federated system. First, a wrapper 114 for the source 121 or 125 must be installed, and federated database server must then be told where to find this wrapper. This is done by means of a CREATE WRAPPER statement. If multiple sources of the same type are desired, only one wrapper is needed. For example, even if the federated system will include five Oracle database instances, possibly on different machines, only one Oracle wrapper is needed, and hence, only one CREATE WRAPPER statement will be required. However, each separate source must also be identified to the system. This is done via a CREATE SERVER statement. If there are five Oracle database instances, five CREATE SERVER statements must be issued.

For example, suppose there is a wrapper for accessing web sites, and a specific site from which the user wants to access data.

This statement basically tells the federated database where to find the code for the web_wrapper. Next, the federated database can be told about the actual web site to be used, by identifying it as a server associated with the web_wrapper.

An OPTIONS clause allows the basic CREATE SERVER statement to be tailored with information that the wrapper will need to access instances of this data source type.

After the wrapper 114 and server 112 have been defined, the data 123 at the remote source 121 must be described in terms of the data model of the federated middleware. Since the federated database described here supports an object-relational data model, each collection of data from an external source must be described to the federated engine as a table with columns of appropriate types. A collection of external data modeled as a table is called a nickname, and its table name and column names are used in the SQL submitted to the federation by applications. Nicknames are identified via a CREATE NICKNAME statement. The following statement sets up a nickname for a collection of information about the weather, and identifies the "columns" that can be used in a query.

An "OPTIONS" clause is again a way to pass information that the wrapper needs, this time in order to process queries against the nickname.

In addition to storing data, many data sources also have the capability to perform specialized searches or other computations. Such capabilities can be represented in SQL as user-defined functions.

User-defined functions that are implemented by an external data source as /mapped/ functions. Mapped functions are, once again, identified to the federated system via DDL statements. A CREATE FUNCTION statement tells the federated database that this is a function that can appear in a SELECT statement.

An AS TEMPLATE clause tells the federated database that there is no local implementation of the function. Next, a CREATE FUNCTION MAPPING statement tells the federated database what server can evaluate the function. Several function mappings may be created for the same function. For our example, the following statement accomplishes the mapping:

DDL statements produce metadata describing the information about nicknames and the signatures of mapped functions. This metadata is used by the federated query processing engine and is stored in the global catalogs of the federated database.

Figure 8:
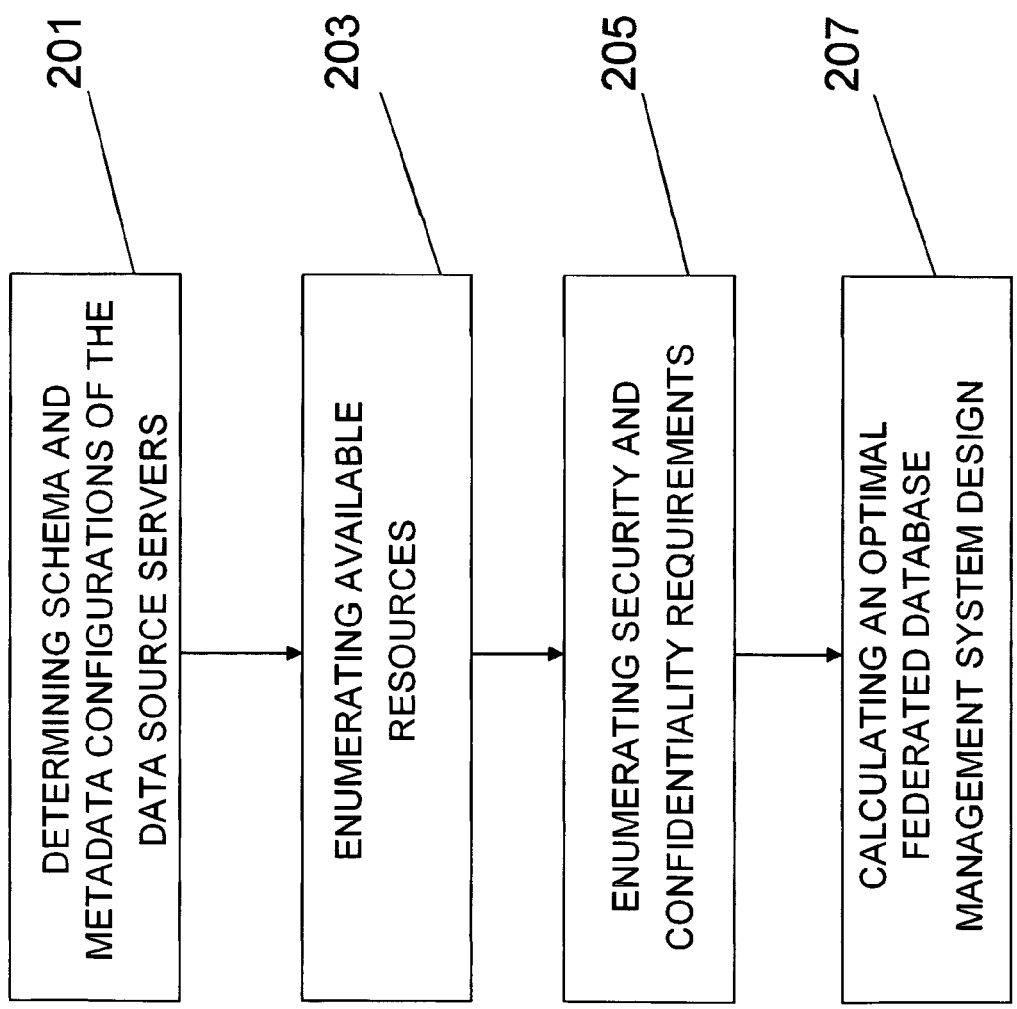
FIG. 8 illustrates an overview of a flow chart for designing a federated database system

The actual design of the metadata and queries is illustrated in FIG. 8 and includes the steps of first determining schema and metadata configurations of the data source servers 201. The next step is enumerating available resources 203, and enumerating security and confidentiality requirements 205. These are used for calculating an optimal federated database management system design based on the schema and metadata, the enumerated available resources, and the enumerated security and confidentiality requirements 207; and designing an optimal federated database management system.

The determination of available resources includes determining people, skill sets, network capability, computing equipment, budget, time constraints, software systems, database management system application program interfaces, and storage.

Determining the security and confidentiality requirements include determining medical records confidentiality, e.g., as imposed by Health Insurance Portability and Privacy act and other statutory and contractual limitations The final step in designing the optimal federated database management system using one or more of an entity unification scheme, conformal dimensions, an aggregation scheme, unified metadata, and a unified data model.

After the federated system is configured, an application can submit a query written in SQL to a federated server. The federated server optimizes the query, developing an execution plan in which the query has been decomposed into fragments that can be executed at individual data sources. As mentioned above, many decompositions of the query are possible, and the optimizer chooses among alternatives on the basis of minimum estimated total resource consumption. Once a plan has been selected, the federated database drives the execution, invoking the wrappers to execute the fragments assigned to them. To execute a fragment, the wrapper performs whatever data source operations are needed to carry it out, perhaps a series of function calls or a query submitted to the data source in its native query language. The resulting streams of data are returned to the federated server, which combines them, performs any additional processing that could not be accomplished by a data source, and returns the final result to the application.

Figure 9:
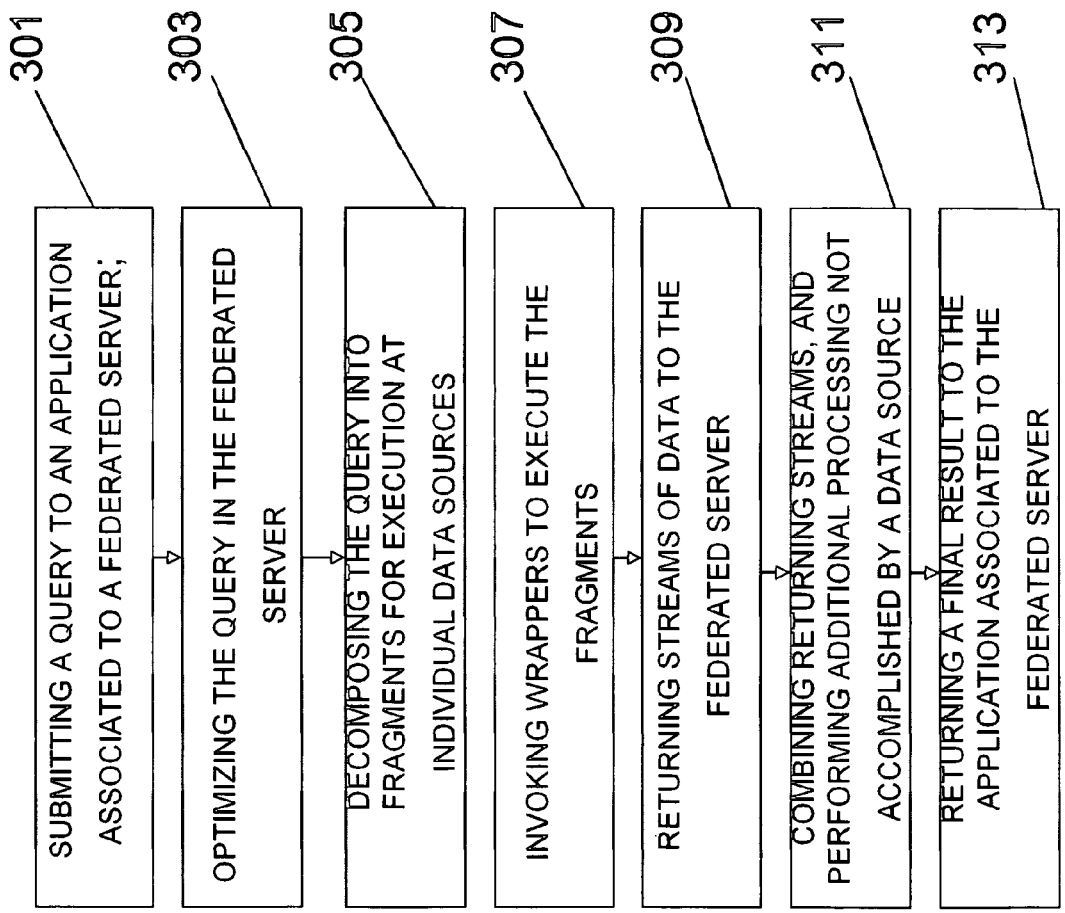
FIG. 9 illustrates an overview of a flow chart executing a query with subsequent processing of the result set.

As shown in FIG. 9, the method includes the step of submitting a query to an application associated to a federated server 301. This is followed by the step of optimizing the query in the federated server 303. Next, the query is decomposed into fragments for execution at individual data sources 305, and invoking wrappers to execute the fragments 307. In the next step streams of data are returned to the federated server, 309. The returned streams are combined and any additional processing performed that has not accomplished by a data source 311. A final result is returned to the application associated to the federated server 313.

The actual optimization of the solution involved first optimizing the choice of optimization techniques and tools, and then using the optimized choice of optimization tools and techniques to attain an optimal or relatively optimal solution. FIG. 10 represents a decision tree for going from an input of the constrained variables and constraints through analysis of the constraints and variables to optimize the optimization tools and techniques, and performing the optimization.

In this way data can be matched to optimization tool and technique, that matching variables and constraints to ETL or Federation or a hybrid thereof The decision tree of FIG. 10 involves looking at each type of data, looking at the models, looking at the metadata, and optimizing to yield a set of initial feasible methods and tools, and then an initial set of optimal or near optimal solutions. This is typically followed by step wise adjustment of weighting functions and objective functions.

In this context, optimization may include extracting limited data from a database to intermediate and virtual tables and extracting selected data from the intermediate and virtual tables for further processing. This avoids operating on confidential or restricted data.

In a preferred exemplification of our invention, represented by the flow chart in FIG. 11, we utilize the synergy of database federation and "Extract, Transform, and Load" ("ETL") database management 401 to query, search, and selectively extract data 403, present the data 405, followed by data analysis and presentation using complex optimization, for example, integer programming, mixed integer programming, heuristics, and artificial intelligence, among other techniques 407. These steps may include heuristics. Additionally, the steps of data analysis and presentation may yield results indicating that a numerical result or results are not obtainable, or that additional data is required, or that sets of candidate solutions require human intervention 409 and requesting additional data 411 if indicated.

The steps of querying, searching, and selectively extracting data are carried out subject to restraints on materialization and presentation. These restraints include, by way of example and not limitation, private personal data, such as the presence of absence of sexually transmitted diseases, the presence or absence of genetic anomalies, and even creditworthiness.

Similarly, the restraints may include institutionally confidential data, such as who will perform work, resource allocations and commitments, budgets, skill sets, policies, allocation of expenses, contributions in kind in lieu of cash payments, time constraints on inputs and outputs. Additionally, in a clinical, testing, or epidemiological context information transfer may be constrained by law, as HIPP limitations, and personal constraints.

The restraints may motivate that data only be fleetingly and momentarily available, and then only in real time. This is to preclude materialization. Similarly, database master keys and personal identification indicia may be maintained confidential by posting them only to virtual tables that are never materialized.

Data inputs may be piecemeal, which may be a result of database federation, or data interfaces. The restraints on data inputs may be driven by resources or budgets.

In general, a federated system is useful in any situation in which there are multiple sources of data, and a need to combine the information from these various sources.

Medical research, drug testing, clinical care, and academic research, inter alia, are multi-location activities implying a need to coordinate activities in multiple locations throughout the world. For example, a pharmaceutical company might have research labs in both Europe and the U.S. Each of the labs houses scientists looking for new drugs to battle particular diseases. The scientists all have access to databases of chemical compounds, stored in special-purpose systems that allow searching by particular characteristics of the compounds or by chemical structure (structural similarity). In both labs, the scientists run high throughput screenings of compounds to test their effectiveness against different biological targets. The results of these tests are stored in relational databases at each lab. Other data sources accessed by the scientists include large flat files of genomic and proteomic information, multidimensional results of clinical trials or disease processes, patient databases, spreadsheets of data and analysis, images and text documents.

For example, scientists in different labs have different but related missions, with different but related cures or treatments that they are pursuing. This leads them to do different experiments, and to focus on particular sets of compounds. However, often the same compounds may be useful against different targets, and sometimes one test may be a good indicator of results for other tests. Thus it is important for the scientists at one lab to have access to the data being produced at the other, so as not to duplicate effort. While this could be accomplished by building a large warehouse with all the compound data and test results, there are several drawbacks to that approach. First, the test result data changes rapidly, with thousands of records being added every day from both sides of the Atlantic, making maintenance difficult. Second, the warehouse must either be replicated at both sites, or one site must suffer slower performance for accessing the data. Replication adds to the cost of the solution and the complexity of maintenance. Third, the compound data, today stored in specialized repositories, would need to be migrated to a relational base, including re-implementing the search algorithms and any existing applications.

A federated solution eliminates these issues. Data is left in the existing data sources, with their native access paths, and current applications run unchanged. However, it is easy to build new applications that can access data from any of the sources, regardless of continent, metadata, or schema. Local data stays local, for rapid access. The less frequently used remote data is still accessible, as needed, and queries are optimized by the federated server to ensure that they are retrieved as efficiently as possible. Replication can still be used if desired for those portions of the data that are heavily accessed by both laboratories.

Significant productivity gains are to be had if a user can work on a plurality of different databases, including selects, inserts, updates, and deletes as if all the tables resided in a single database. Database federation does exactly that: it makes the tables look like they are all in the same database.

A federated system operates on the tables in the remote systems, the "data sources". The remote tables appear as virtual tables in the federated database server 112 database. Client application programs can perform operations on the virtual tables in the federated database server 112 database, but the real persistent storage is in the remote databases 121, 125.

Each back end data source 121, 125 views the federated database server 112 as just another database client connection. The back end data source 121, 125 is simply servicing client requests for database operations. The federated database server 112 needs client software to access each remote database. Client software for IBM Informix®, Sybase, Oracle, etc. would need to be installed to access each type of back end data source 121, 125.

The application interface to the database federation is SQL. This provides a significant productivity boost over having to learn a new interface. The remote tables are accessed with the same syntax as local tables for select, insert, update, and delete. Not all table operations are possible, but Information Integrator in DB2 v8 takes a big step forward by providing insert and update functionality.

A "wrapper" defines a library file (where the library is represented as element 114 in FIG. 7) that understands how to communicate with the back en data source database, 121, 125. It uses client connectivity software to access the remote database There are two ways to define the wrapper, using SQL, or in DB2 v8 using a graphical user interface (GUI).

An example of creating a wrapper using SQL is shown here:

|CREATE WRAPPER "INFORMIX" LIBRARY 'db2informix.dll'; |

The GUI wizard is launched from the Control Center

Here's an example of the SQL:

```
CREATE SERVER "rcfliif"
TYPE INFORMIX VERSION '9.3'
WRAPPER "INFORMIX" OPTIONS ( NODE 'fliif',
    DBNAME 'stores_demo'
    , ADD CPU_RATIO '1'
    , ADD IO_RATIO '1'
    , ADD COMM_RATE '1'
    , ADD DB2_MAXIMAL_PUSHDOWN 'Y'
);
```

The NODE specifies the remote database server and is not a TCP/IP hostname. The DBNAME defines the remote database.

PUSHDOWN is the default and it indicates that joins should take place on the remote server where possible. We'll test this and look at some database optimizer explain plans in a later section.

The invention may be implemented, for example, by having the system for searching, extracting, transforming, loading, and presenting data from a federated database management system by executing the method as a software application, in a dedicated processor or set of processors, or in a dedicated processor or dedicated processors with dedicated code. The code executes a sequence of machine-readable instructions, which can also be referred to as code. These instructions may reside in various types of signal-bearing media. In this respect, one aspect of the present invention concerns a program product, comprising a signal-bearing medium or signal-bearing media tangibly embodying a program of machine-readable instructions executable by a digital processing apparatus to perform a method for searching, extracting, transforming, loading, and presenting data from a federated database management system as a software application.

This signal-bearing medium may comprise, for example, memory in a server. The memory in the server may be non-volatile storage, a data disc, or even memory on a vendor server for downloading to a processor for installation. Alternatively, the instructions may be embodied in a signal-bearing medium such as the optical data storage disc. Alternatively, the instructions may be stored on any of a variety of machine-readable data storage mediums or media, which may include, for example, a "hard drive", a RAID array, a RAMAC, a magnetic data storage diskette (such as a floppy disk), magnetic tape, digital optical tape, RAM, ROM, EPROM, EEPROM, flash memory, magneto-optical storage, paper punch cards, or any other suitable signal-bearing media including transmission media such as digital and/or analog communications links, which may be electrical, optical, and/or wireless. As an example, the machine-readable instructions may comprise software object code, compiled from a language such as "C++", Java, Pascal, ADA, assembler, and the like.

Additionally, the program code may, for example, be compressed, encrypted, or both, and may include executable code, script code and wizards for installation, as in Zip code and cab code. As used herein the term machine-readable instructions or code residing in or on signal-bearing media include all of the above means of delivery.

While the foregoing disclosure shows a number of illustrative embodiments of the invention, it will be apparent to those skilled in the art that various changes and modifications can be made herein without departing from the scope of the invention as defined by the appended claims. Furthermore, although elements of the invention may be described or claimed in the singular, the plural is contemplated unless limitation to the singular is explicitly stated.

We claim:

1. A method for optimizing a federated database management system having a federated database server and a plurality of data source servers comprising the steps of:
   a) determining schema and metadata configurations of the data source servers;
   b) enumerating available resources;
   c) enumerating security and confidentiality requirements;
   d) calculating an optimal federated database management system design based on the schema and metadata, the enumerated available resources, and the enumerated security and confidentiality requirements, wherein said calculating includes:
      (i) modeling a cost in terms of available resources consumed by each strategy of a plurality of strategies while executing a query with said federated database management system;
      (ii) determining whether operations associated with said query should be performed by said federated database server or one of said data source servers;
      (iii) determining the optimal order of said operations associated with said query;
   e) designing an optimal federated database management system, wherein said designing includes:
      (i) selecting the strategy having the lowest cost for executing said query;
      (ii) in response to determining that said operations associated with said query should be performed by said federated database server, selecting said federated database server to perform said operations according to said optimal order;
      (ii) in response to determining that said operations associated with said query should be performed by one of said data source servers, selecting said data source server to perform said operations according to said optimal order; and
   f) providing functionality for user input including user heuristics and data inputs.

2. The method of claim 1 wherein available resources include people, skill sets, network capability, computing equipment, budget, time constraints, software systems, database management system application program interfaces, and storage.

3. The method of claim 1 wherein the security and confidentiality requirements include medical records confidentiality.

4. The method of claim 1 comprising designing the optimal federated database management system using one or more of an entity unification scheme, conformal dimensions, an aggregation scheme, unified metadata, and a unified data model.

5. A program product comprising a storage medium containing computer readable program code for directing a computer system to carry out the steps of:
   a) determining schema and metadata configurations of the data source servers;
   b) enumerating available resources;
   c) enumerating security and confidentiality requirements;
   d) calculating an optimal federated database management system design based on the schema and metadata, the enumerated available resources, and the enumerated security and confidentiality requirements, wherein said calculating includes:

(i) modeling a cost in terms of available resources consumed by each strategy of a plurality of strategies while executing a query with said federated database management system;

(ii) determining whether operations associated with said query should be performed by said federated database server or one of said data source servers;

(iii) determining the optimal order of said operations associated with said query;

e) designing an optimal federated database management system, wherein said designing includes:

(i) selecting the strategy having the lowest cost for executing said query;

(ii) in response to determining that said operations associated with said query should be performed by said federated database server, selecting said federated database server to perform said operations according to said optimal order;

(ii) in response to determining that said operations associated with said query should be performed by one of said data source servers, selecting said data source server to perform said operations according to said optimal order; and f) providing functionality for user input including user heuristics and data inputs.

6. The program product of claim 5 wherein available resources include people, skill sets, network capability, computing equipment, budget, time constraints, software systems, database management system application program interfaces, and storage.

7. The program product of claim 5 wherein the security and confidentiality requirements include medical records confidentiality.

8. The program product of claim 5 comprising designing the optimal federated database management system using one or more of an entity unification scheme, conformal dimensions, an aggregation scheme, unified metadata, and a unified data model.

* * * * *